United States Patent [19]

Iwamoto

[11] Patent Number: 5,086,152
[45] Date of Patent: Feb. 4, 1992

[54] HEAT-CURING TYPE RESINOUS COMPOSITION AND HEAT-RESISTING MOLDED ARTICLE PREPARED THEREFROM

[75] Inventor: Norikazu Iwamoto, Hyogo, Japan

[73] Assignee: Nippon Paint Co., Ltd., Osaka, Japan

[21] Appl. No.: 559,282

[22] Filed: Jul. 27, 1990

[30] Foreign Application Priority Data

Aug. 8, 1989 [JP] Japan ................................. 1-205298

[51] Int. Cl.⁵ ............................................. C08G 18/00
[52] U.S. Cl. ......................................... 528/55; 528/58
[58] Field of Search .................................. 528/55, 58

[56] References Cited

U.S. PATENT DOCUMENTS 3,793,236  2/1974  Ashida et al. ........................ 528/55

*Primary Examiner*—Maurice J. Welsh
*Assistant Examiner*—Rachel Johnson
*Attorney, Agent, or Firm*—Wenderoth, Lind & Ponack

[57] ABSTRACT

Three-component- or two-component-heat curing type resinous compositions are provided, consisting essentially of (a) a polyisocyanate component comprising at least one bi-to hexa-functional polyisocyanate compound, (b) a polyepoxide component comprising at least one bi-to hexa-functional polyepoxide compound and (c) a catalyst component selected from complex of organo antimony halide and organo tin halide or complex of organo antimony halide and zinc halide, the catalyst component (c) being packed in a separate pack other than the packs of said (a) and of said (b), or packed in either pack of (a) or of (b). The present resinous compositions are especially useful as a molding material.

4 Claims, No Drawings

HEAT-CURING TYPE RESINOUS COMPOSITION AND HEAT-RESISTING MOLDED ARTICLE PREPARED THEREFROM

FIELD OF THE INVENTION

The present invention relates to three-component or two-component heat-curing type resinous composition comprising polyisocyanate, polyepoxide and catalyst and to heat-resisting molded article prepared therefrom, consisting essentially of polyoxazolidone and containing the least amount of trimerized polyisocyanurate.

BACKGROUND OF THE INVENTION

The so-called heat-curing type resinous compositions have been widely used as molding, impregnation, lamination and injection molding materials as well as various electric insulation material, structural plastics, coating material, adhesives and the like. Recently, with an increasing demand of using such materials under much severe conditions, heat-resistance of such materials become the center of public concerns.

Since the plastics formed by the reaction of polyisocyanate and polyepoxide have excellent thermal properties, many efforts are concentrated in the development works of this novel type of resinous materials.

It is in general recognized that the resins obtained by the reaction of polyisocyanates and polyepoxides are excellent in heat-resisting properties, but are undesirably hard and brittle and have the problems of deficient impact strength.

Excellent heat-resisting properties are believed to be due to their specific ring structure having oxazolidone group and isocyanurate group produced by the reaction of the indicated materials, and poor impact strength and the like are to the presence of excessively highly cross-linked structures derived from trimerized isocyanurate groups. Therefore, it is expected that stiff resins might be obtained by the reaction of polyepoxide and polyisocyanate if only something be devised to give polyoxazolidone containing the least amounts of trimerized isocyanurate.

Oxazolidone ring-formation reaction is in general carried out without using a catalyst at an elevated temperature. When adopted, the following catalysts are generally used.

That is, tertiary amines (e.g. imidazole, hexamethylene tetramine), tetraethyl ammonium iodide, combination of aluminium chloride and pyrrolidone, combination of aluminium chloride and phosphoric ester, lithium halide, complex of lithium halide and phosphoric acid (e.g. complex of lithium bromide and tributyl phosphine oxide) and the like. Recently, Matuda et al reported in J. Org. Chem. p.2177 to 2184, (12) 1986 and Chemistry Letters, p.1963 to 1966, 1986, complexe of organo tin halide and Lewis base or stibonium as a novel oxazolidonation catalyst. Marks, Morris and Brebees Leimond disclosed in Japanese Patent Publication (unexamined) 500730/87 organoantimony compounds as an effective catalyst for the preparation of polyoxazolidone resin.

In the case of reaction between mono-functional compounds, i.e. monoepoxide and monoisocyanate, the desired oxazolidone compound may be obtained in the presence of such catalyst, though the reaction must be carried out at a higher temperature for a long period of time. However, in the case of reaction between highly functional polyepoxide and polyisocyanate, the reactions involved are more complicated and a quantity of undesired products are always by-produced. Such by-products are essentially trimerized isocyanurate and polyether produced by the homopolymerization of epoxide. Among them, trimerized isocyanurate may give highly crosslinked, brittle polymer and therefore, trimerization reaction must be effectively controlled. Nevertheless, heretofore proposed catalysts for the formation of polyoxazolidone, are not only effective for the oxazolidone formation reaction, but also for the isocyanurate formation reaction and therefore, the polyoxazolidone products prepared by the known processes do always include 30 mol % or more isocyanurate. Furthermore, in the reaction between isocyanate and epoxide, with the increase in the amounts of said epoxide, a strong exothermic reaction is liable to occur, causing scorch in the formed moldings and heat deterioration of the molded article. For this reason, it has long been desired to provide a method for the preparation of polyoxazolidone containing the least amounts of trimerized isocyanurate by the reaction of polyepoxide and polyisocyanate under mild conditions.

It is, therefore, an object of the invention to provide a heat-curing type resinous composition capable of resulting a high quality plastic of polyoxazolidone through the reaction of polyepoxide and polyisocyanate components and to provide a molded article with excellent heat-resisting properties composed of polyoxazolidone containing the least amount of trimerized isocyanurate.

SUMMARY OF THE INVENTION

According to the invention, the above-mentioned object can be attained by providing 1. Three-component-heat-curing type resinous composition consisting of
   (a) a polyisocyanate component comprising at least one bi-to hexa-functional polyisocyanate compound,
   (b) a polyepoxide component comprising at least one bi-to hexafunctional polyepoxide compound, and
   (c) a catalyst component comprising at least one catalyst selected from the group consisting of complex of organo antimony halide and organo tin halide, and complex of organo antimony halide and zinc halide. 2. Two-component-heat-curing type resinous composition consisting of
   (a) a polyisocyanate component comprising at least one bi-to hexa-functional polyisocyanate compound, and
   (b) a polyepoxide component comprising at least one bi-to hexafunctional polyepoxide compound, either component (a) or (b) further containing at least one catalyst selected from the group consisting of complex of organo antimony halide and organo tin halide and complex of organo antimony halide and zinc halide.

3. Two-component-heat-curing type resinous composition consisting of
   (a) a polyisocyanate component comprising at least one bi-to hexa-functional polyisocyanate compound, and
   (b) a polyepoxide component comprising at least one bi-to hexafunctional polyepoxide compound,
either component (a) or (b) containing organo antimony halide and the remaining component (b) or (a) containing organo tin halide or zinc halide or mixture of organo tin halide and zinc halide.

4. Heat-resisting molded article obtained by reacting any one of the resinous compositions of claims 1 to 3 in a mold at a temperature between room temperature and 150° C.

PREFERRED EMBODIMENTS OF THE INVENTION

The present resinous composition comprises basically polyepoxide, polyisocyanate and catalyst and in this invention, said composition is heated and reacted under mild conditions for short period of time in a mold to obtain a heat-resisting molded article.

In this method, the principal reaction is an oxazolidone formation reaction and there are quite few polyisocyanate trimerization and polyepoxide homopolymerization reactions.

As a consequence, in the product polymer precursor, there include no or very little amounts of isocyanurate groups. The total reaction speed is comparatively high and the desired moldings can be prepared under mild conditions.

The present reactive resinous composition may be provided as three-package or two-package type composition.

The first polyisocyanate component may be any of bi-to hexa functional organopolyisocyanate compounds well known in the polyurethane art. Examples of the said organopolyisocyanate compounds are aromatic polyisocyanates as 2,4-tolylene diisocyanate, 2,6-tolylene diisocyanate, naphthlene 1,5-diisocyanate, diphenylmethane 4,4-diisocyanate and the like; aliphatic or alicyclic polyisocyanates as hexamethylene diisocyanate, hydrogenated diphenyl methane 4,4'-diisocyanate, isophorone diisocyanate, hydrogenated 2,4-tolylene diisocyanates hydrogenated 2,6-tolylene diisocyanate and the like. Various modified polyisocyanates are reported in literatures and offered in the market, as, for example, polyisocyanate pre-polymer having end isocyanate groups obtained by the reaction of polyisocyanate and active hydrogen compound as stated in U.S. Pat. No. 3,394,164 and sold under the names of Isonate 181 (Dow chem. Co), Mondur PF (Mobay) and the like; carbodiimide or urethoimine bearing polyisocyanates as reported in U.S. Pat. No. 3,152,162 and sold under the names of Isonate 1431 (Dow chem Co.), Mondur CD (Mobay), Milionate MTL (Nippon polyurethane K.K.) and the like; Allophanate bond containing polyisocyanates as reported in U.S. Pat. No. 3,124,605 and sold under the names of Desmodur N (Mobay) and the like; isocyanurate ring containing polyisocyanates as reported in U.S. Pat. No. 3,001,973 and sold under the names of Desmodur Z-4370, Desmodur CTStabil (Mobay) and the like. These modified polyisocyanates may be satisfactorily used in this invention. In general, particular preference is given to such crude polyisocyanate products as crude tolylene diisocyanates obtained by phosgenization of tolylene diamine mixture or crude diphenyl methylene diisocyanates obtained by phosgenization of crude diphenyl methylene diamine.

As the epoxide component, any of aliphatic, alicyclic or aromatic or heterocyclic compounds having 2 or more epoxy groups may be satisfactorily used. From the standviews of composition viscosity, application easiness and heat-resisting properties of the molded articles, particularly preferable members should have 2 to 4, most preferably 2, epoxy groups per molecule, and 90 to 500, most preferably 170 to 220, of epoxy equivalent.

Examples of preferred epoxides are bisphenol A diglycidyl ether derived from bisphenol A or halogene substituted derivative thereof and epihalohydrin; bisphenol F diglycidyl ether and the like.

Examples of such epoxy resins are the products sold under the names of DER-332, DER 542 (Dow chem. Co.), YD-128, YDF- 170 (Tohto Kasei), Epicoat 828 (Shell), Epiclon 850, Epiclon 830 (Dainippon Ink) and the like. Polynuclear glycidyl ether derived resins and epoxide phenyl novolak resins are also useful. Such products are sold under the names of DEN-431 and DEN-438 (Dow chem. Co.), EPN-1139 and ECN-1235 (Ciba-Geigy) and the like. Aromatic glycidyl amine resins based on aromatic amines and epichloro-hydrin are likewise useful and examples are triglycidyl-p aminophenol, N,N,N',N'-tetraglycidyl-4,4'-diaminodiphenyl methane and the like. Another groups of appropriate epoxy resins are glycidyl esters of aromatic, aliphatic or alicyclic polybasic acids and the reaction products of aromatic or alicyclic dicarboxylic acids and polyols.

Examples of such epoxy resins are CY-192, CY-184 (Ciba-Geigy), EPOMIK-508 and EPOMIK-540 (Mitsui Sekiyu Kagaku K.K.) and the like. Appropriate aliphatic epoxy resins are glycidyl ethers of alkyleneglycols and glycidyl ethers of polyetherpolylos, sold under the names of DER-736 and DER-732 (Dow chem. Co.), EPOMIK R-810 (Mitsui Sekiyu Kagaku K.K.) and the like. Epoxidation products of cycloolefins are also appropriate and such epoxy resins are 3,4-epoxy cyclohexane carboxylates sold under the names of ERL-4221 (Union Carbid), CY-179 (Ciba-Geigy) and the like.

These may be used each in singularly or in the combination of 2 or more.

The catalyst component is a compound which can promote the oxazolidone ring formation reaction of epoxide and isocyanate. Preferable members are (a) complexes of organo antimony halides and organo tin halides, and (b) complexes of organo antimony halides and zinc halides.

The organo antimony halides used as a component of said complex are preferably represented by the formula:

$$R_3SbX_2 \qquad (1)$$

in which X represents halogen (as bromine and iodine); and each R represents separately an aliphatic, aromatic or alicyclic organic group.

Examples of such organo antimony halides are triphenyl antimony diiodide, triphenyl antimony dibromide, tribenzyl antimony diiodide, tribenzyl antimony dibromide, tributyl antimony diiodide, tributyl antimony dibromide and the like.

As an organo tin halide, the following compounds may be advantageously used.

$$R_m Sn X_{(4-m)} \qquad (2)$$

in which X represents halogen (e.g. bromine and iodine); m is an integer of 1 to 3; and each R represents separately aliphatic, aromatic or alicyclic organic group.

Examples of preferred members are trimethyl tin iodide, trimethyl tin bromide, dimethyl tin diiodide, dimethyl tin dibromide, tripropyl tin iodide, tripropyl tin bromide, dipropyl tin diiodide, dipropyl tin dibromide, tributyl tin iodide, tributyl tin bromide, dibutyl tin diiodide, dibutyl tin dibromide, trioctyl tin iodide, trioctyl tin bromide, dioctyl tin diiodide, dioctyl tin dibromide, triphenyl tin iodide, triphenyl tin bromide, diphenyl tin diiodide, diphenyl tin dibromide, tricyclohexyl tin iodide, tricyclohexyl tin bromide, dicyclohexyl tin diiodide, dicyclohexyl tin dibromide and the like.

As already stated, the combinations of these components, i.e. complexes, may be used as catalysts in this invention. Such complex can be advantageously prepared by reacting the constituting components, preferably in equimolar ratio, in the presence or absence of solvent at a temperature between room temperatures and 150° C. The complex catalyst may be present, together with an appropriate solvent, as a separate component or in either one of said polyisocyanate component or polyepoxide component of the present resinous compositions.

The amount of such catalyst is preferably determined in a range of 0.01 to 10% by weight, most preferably 0.1 to 5% by weight, of the total weight of the polyepoxide and polyisocyanate.

It is of course possible to use a combination of different catalysts.

The inventors have surprisingly found that even if the catalyst components each is included in different phase of polyepoxide and polyisocyanate separately, and these catalyst components are reacted with each other in the heat-curing step of the resinous composition, thus formed complex is effectively acted as a catalyst. When a complex catalyst is added to either one of polyepoxide or polyisocyanate, there are cases where the storage stability of the combined mixture be adversely affected. Therefore, inclusion of catalyst component in each different phase of polyepoxide and polyisocyanate can afford particularly preferable two-package resinous composition. More specifically, in the case of complex of organo antimony halide and organo tin halide, said organo tin halide is preferably added to polyisocyanate component and organo antimony halide in polyepoxide component. In the case of complex of organo antimony halide and zinc halide, the former is added to polyisocyanate component and zinc halide to polyepoxide component. In such cases, the respective catalyst component is safely maintained without losing desired storage stability of the respective resinous components, i.e. polyepoxide and polyisocyanate.

In this invention, besides the abovementioned essential components, any of the conventional additives as filler, reinforcement fibers, antioxidant, flame retardant, mold releasing agent, pigment, surfactant, catalyst, defoamer and the like may be added as desired.

The oxazolidone group present in the present heat-curing type resinous composition is known, as well as isocyanurate group, to give a resin far better heat distortion properties and thermal stabilities than urethane group. Furthermore, such polymer can exhibit an excellent chemical resistance and solvent stability.

Incidentally, depending on the relative amount ratio of polyepoxide and polyisocyanate used, properties of thus obtained polyoxazolidone resin are somewhat varied. When a stoichiometrically excess amount of polyisocyanate is used, there results a polymer having isocyanate groups at the ends and oxazolidone bondings at the main chain thereof, i.e. end isocyanate group containing oxazolidone polymer precursor. When a soichiometrically excess amount of epoxide is used, a polymer having epoxy groups at the ends and oxazolidone bondings at the main chain, i.e. end epoxy group containing oxazolidone polymer precursor. When substantially equivalent amounts of polyepoxide and polyisocyanate are used, a high molecular weight polymer, i.e. polyoxazolidone, is advantageously obtained. Since various polymers or polymer precursors having different properties can be expected with the invention by varying the weight ratio of polyepoxide and polyisocyanate used, such weight ratio is not limited in a specific range and may be varied in comparatively wide range.

From the end isocyanate group containing oxazolidone polymer precursor, it is possible to prepare by using a conventional technique for the preparation of polyurethane or polyurea, wax, elastomer, foam, coating material, adhesive and the like.

From the end epoxy group containing oxazolidone polymer precursor, various coating materials, adhesives and the like through the reaction with epoxy hardener. Oxazolidone polymer is suitable for the preparation of heat-curable resin for molded article, coating, adhesive and the like.

The present resinous composition is also useful as an impregnation material for electric insulating materials, glass fiber reinforced laminate and the like, injection material for the preparation of print base plate, electric parts for computer and the like, and as the starting material for the preparation of automobile and airplane parts which are required to have improved stress properties and heat resistance. Among them, the most important application of the present resinous composition is the preparation of heat-resisting molded article.

Therefore, according to the second aspect of the invention, is provided a polyoxazolidone molded article having excellent heat resisting properties prepared by reacting the present resinous composition in a mold at a temperature of room temperature to 150° C.

The oxazolidone formation reaction is advantageously carried out by reacting polyisocyanate and polyepoxide in the presence of the present catalyst. The reaction temperature may be varied in a range of room temperature to 150° C., preferably from 40° to 150° C. Optimum temperature is, depending on the employed polyisocyanate and polyepoxide, usually in a range of 60° to 120° C. In a more preferable embodiment, thus obtained poly-oxazolidone resin is subjected to post curing at a temperature of 100° to 300° C., preferably 120° to 200° C.

If desired, the present oxazolidone formation reaction may be carried out in the presence of appropriate solvent or diluent which is innert to the abovementioned reaction. Examples of such solvents or diluents are aromatic, ester series, or halide series solvents. Preferably, such solvent or diluent should not affect on the formation of catalyst or catalyst itself. Said reaction may be carried out batchwise or on continuous basis. By the selective use of divided catalyst component system, the present molded article may be prepared by either one shot method or prepolymer method heretofore known in the art. Any of the conventional molding processes including vacuum defoaming molding process, injection molding and the like may be advantageously used.

The invention shall be now more fully explained in the following Examples.

EXAMPLE 1

Into a 100 ml flask containing 40.5 g of dichloromethane, we added 16.5 g of dimethyl tin diiodide ($Me_2SnI_2$) and 24.0 g of triphenyl antimony diiodide ($Ph_3SbI_2$) and the mixture was stirred at room temperature for about 1 hour to obtain a catalyst solution.

In a separate 50 ml flask were placed 3.5 g of bisphenol A epichlorohydrin epoxy resin having an epoxy equivalent of 175 and to this, were added 0.38 g of the abovementioned catalyst solution and stirred to effect defoaming.

To the abovementioned solution 2.9 g of low viscosity diphenylmethane diisocyanate based on polyisocyanate compound having NCO content of 29% were added at room temperatures and stirred to effect defoaming.

Thereafter the content was heated at 80° C. for 1 hour to obtain a hard, tough polymer. Infra-red absorption spectrum of this polymer showed the fact that characteristic absorptions at 910 cm$^{-1}$ for epoxy group and 2250 cm$^{-1}$ for polyisocyanate group had disappeared and showed the strong absorption at 1740 cm$^{-1}$ for oxazolidone group.

It was also found that only small quantity of trimerized isocyanurate (1705cm$^{-1}$) were resulted.

EXAMPLE 2

Into a 50 ml flask, were placed 3.5 g of bisphenol A epichlorohydrin epoxy resin having an epoxy equivalent of 175 and 0.38 g of the catalyst solution obtained in Example 1, and the mixture was stirred and defoamed.

To this, 2.61 g of low viscosity polyisocyanate compound based on dicyclohexane methane diisocyanate, whose NCO content was 32%, were added at room temperature, stirred and defoamed.

The resinous composition was heated at 100° C. for 1 hour to obtain a hard, tough polymer.

Infra-red absorption spectrum of this polymer showed the fact that characteristic absorptions at 910 cm$^{-1}$ for epoxy group and 2250 cm$^{-1}$ for isocyanate group had almost completely disappeared and that there was sure evidence (1740-20 cm$^{-1}$) indicating the formation of oxazolidone group but no indication (1705 cm$^{-1}$) of trimerized isocyanurate group.

EXAMPLE 3

Into a 100 ml flask containing 38.7 g of acetone, were added 4.5 g of zinc dibromide and 12.1 g of triphemyl antimony diiodide ($Ph_3SbI_2$) and the mixture was stirred at room temperature for about 1 hour to obtain a catalyst solution.

Into a 50 ml flask, were placed 3.5 g of bisphenol A epichlorohydrin epoxy resin having an epoxy equivalent of 175 and 0.55 g of the abovementioned catalyst solution and stirred to effect defoaming.

To this, 2.9 g of low viscosity polyisocyanate compound based on diphenylmethane diisocyanate, whose NCO content was 29%, were added at room temperature, stirred and defoamed.

The resinous composition was heated at 80° C. for 1hour to obtain a hard, though polymer.

Infra-red absorption spectrum of this polymer showed that the characteristic peaks at 910 cm$^{-1}$ for epoxy group and 2250 cm$^{-1}$ for isocyanate group had almost completely disappeared and that there was a clear indication of the formation of oxazolidone group at 1740 cm$^{-1}$, but substantially no indication of the formation of trimerized isocyanurate group at 1705 cm$^{-1}$.

EXAMPLE 4

Into a 30 ml flask, were placed 3.5 g of bisphenol A epichlorohydrin epoxy resin having an epoxy equivalent of 175 and an acetone solution containing 0.066 g of zinc diiodide ($ZnI_2$) and 0.12 g of triphenyl antimony diiodide, and the mixture was stirred and defoamed.

To this, 2.9 g of low viscosity polyisocyanate compound based on diphenylmethane diisocyanate, whose NCO content was 29%, were added at room temperature, stirred and defoamed.

This resinous composition was heated at 80° C. for 1 hour to obtain a hard, though polymer.

Infra-red absorption spectrum of this polymer showed that the characteristic peaks at 910 cm$^{-1}$ for epoxy group and 2250 cm$^{-1}$ for isocyanate group had almost completely disappeared and that there was a clear indication of the formation of oxazolidone group (1740 cm$^{-1}$) and a very little amount of trimerized isocyanurate group (1705 cm$^{-1}$).

EXAMPLE 5

Into a 20 ml flask, were placed 3.5 g of bisphenol A epichlorohydrin epoxy resin having an epoxy equivalent of 175 and 0.55 g of the catalyst solution obtained in Example 3, and the mixture was stirred and defoamed.

To this, 2.62 g of low viscosity polyisocyanate based on dicyclohexane methane diisocyanate, having NCO content of 32% were added at room temperature and the mixture was stirred to effect defoaming and then reacted at 100° C. for 1 hour to obtain a hard, tough polymer.

Infra-red absorption spectrum of this polymer showed that the characteristic peaks at 910 cm$^{-1}$ for epoxy group and 2250 cm$^{-1}$ for isocyanate group had almost completely disappeared and that there was a clear indication of the formation of oxazolidone group (1740 cm$^{-1}$) and no trimerized isocyanurate group (1705 cm$^{-1}$).

EXAMPLE 6

Into a 50 ml flask, were placed 3.5 g of epoxide phenyl novolak resin having an epoxy equivalent of 175 and 0.38 g of the catalyst solution obtained in Example 1, and the mixture was stirred and defoamed.

To this, 2.9 g of low viscosity polyisocyanate compound based on diphenylmethane diisocyanate, whose NCO content was 29%, were added at room temperature, stirred and defoamed.

This resinous composition was heated at 80° C. for 1 hour to obtain a hard, though polymer.

Infra-red absorption spectrum of this polymer showed that the characteristic peaks at 910 cm$^{-1}$ for epoxy group and 2250 cm$^{-1}$ for isocyanate group had disappeared and that there was a clear indication of the formation of oxazolidone group (1740 cm$^{-1}$), but only small amount of isocyanurate group (1705 cm$^{-1}$).

EXAMPLE 7

Into a 50 ml flask, were placed 3.5 g of epoxide phenyl novolak resin having an epoxy equivalent of 175 and 0.55 g of the catalyst solution obtained in Example 3, and the mixture was stirred and defoamed.

To this, 2.9 g of low viscosity polyisocyanate compound based on diphenylmethane diisocyanate, whose NCO content was 29%, were added at room temperature, stirred and defoamed.

The resinous composition was heated at 100° C. for 1 hour to obtain a hard, though polymer.

Infra-red absorption spectrum of this polymer showed that the characteristic peaks at 910 cm$^{-1}$ for epoxy group and 2250 cm$^{-1}$ for isocyanate group had disappeared and that there was a clear indication of the formation of oxazolidone group (1740 cm$^{-1}$), but no trimerized isocyanurate group (1705 cm$^{-1}$).

EXAMPLE 8

To 100 g of bisphenol A epichlorohydrin epoxy resin having an epoxy equivalent of 175, were added 1.72 g of triphenylantimony diiodide dissolved in chloroform and stirred and defoamed to prepare a solution of polyepoxide component.

Separately, to 100 g of low viscosity polyisocyanate compound based on diphenylmethane diisocyanate having a NCO content of 29%, 1.38 g of dimethyltin diiodide were added and the mixture was stirred and defoamed to obtain a polyisocyanate component solution. 3.62 g of the polyisocyanate solution were placed in a 50 ml flask and the mixture was stirred at room temperatures to effect defoaming and then reacted at 80° C. for 1 hour to obtain a hard, tough polymer.

Infra-red absorption spectrum of this polymer showed that there were no absorption peaks at 910 cm$^{-1}$ for epoxy group and 2250 cm$^{-1}$ for isocyanate group.

There was the peak at 1740 cm$^{-1}$ for oxazolidone group at 1705 cm$^{-1}$ for trimerized isocyanurate group but no peak.

The abovementioned polyepoxide solution and polyisocyanate solution each showed excellent storage stability.

EXAMPLE 9

To 100 g of bisphenol A epichlorohydrin epoxy resin having an epoxy equivalent of 175, were added 5.2 g of 25% zinc dibromide acetone solution, and the mixture was stirred and defoamed under reduced pressure to obtain a polyepoxide component solution.

Separately, to 100 g of low viscosity polyisocyanate compound based on diphenylmethane diisocyanate having a NCO content of 29% were added 16.6 g of 25% triphenyl antimony diiodide chloroform solution and the mixture was stirred and defoamed under reduced pressure to obtain a polyisocyanate component solution.

3.55 g of the abovementioned polyepoxide solution and 3.02 g of the polyisocyanate solution were placed in a 50 ml flask and the mixture was stirred at room temperatures to effect defoaming and then reacted at 80° C. for 1 hour to obtain a hard, tough polymer.

Infra-red absorption spectrum of this polymer showed that there were no absorption peaks at 910 cm$^{-1}$ for epoxy group and 2250 cm$^{-1}$ for isocyanate group.

There was the peak at 1740 cm$^{-1}$ for oxazolidone group but no peak at 1705 cm$^{-1}$ for trimerized isocyanurate group.

The abovementioned polyepoxide solution and polyisocyanate solution each showed excellent storage stability.

COMPARATIVE EXAMPLE 1

Into a 50 ml flask, were placed 3.5 g of bisphenol A epichlorohydrin epoxy resin having an epoxy equivalent of 175 and 0.48 g of 25% triphenyl antimony diiodide chloroform solution and the mixture was stirred and defoamed.

To this, 2.9 g of low viscosity polyisocyanate compound based on diphenyl methane diisocyanate, having a NCO content of 29% were added at room temperatures and the mixture was stirred and defoamed.

The combined was heated at 100° C. for 1 hour to obtain a hard, brittle polymer.

Infra-red absorption spectrum showed that there were certain quantities of epoxy groups (910 cm$^{-1}$) and isocyanate groups (2250 cm$^{-1}$) in the product.

There were also detected the peak at 1740 cm$^{-1}$ for oxazolidone group and at 1705 cm$^{-1}$ for trimerized isocyanurate group.

COMPARATIVE EXAMPLES 2-4

The similar experiments as stated in comparative Example 1 were repeated excepting using the compounds shown in Table 1 as catalyst.

Hard polymers were only obtained in the cases of Comparative Example 2 and 3.

The polymer obtained in Comparative Example 4 was liquid.

In such polymers epoxy groups and isocyanate groups were detected by infra-red absorption spectrum.

A quantity of trimerized isocyanurate groups were also detected, as well as oxazolidone groups.

TABLE 1

| Comp-Example | Catalyst | amount | polymer obtained |
|---|---|---|---|
| 2 | Me$_2$SnI$_2$ | 0.08 | good appearance brittle solid |
| 3 | ZnI$_2$ | 0.05 | good appearance brittle solid |
| 4 | ZnBr$_2$ | 0.06 | viscous liquid |

What is claimed is:

1. Three-component-heat-curing type resinous composition consisting of
   (a) a polyisocyanate component comprising at least one bi-to hexa-functional polyisocyanate compound,
   (b) a polyepoxide component comprising at least one bi-to hexafunctional polyepoxide compound, and
   (c) a catalyst component comprising at least one catalyst selected from the group consisting of complex of organo antimony halide and organo tin halide, and complex of organo antimony halide and zinc halide.

2. Two-component-heat-curing type resinous composition consisting of
   (a) a polyisocyanate component comprising at least one bi-to hexa-functional polyisocyanate compound, and
   (b) a polyepoxide component comprising at least one bi-to hexafunctional polyepoxide compound, either component (a) or (b) further containing at least one catalyst selected from the group consisting of complex of organo antimony halide and organo tin halide and complex of organo antimony halide and zinc halide.

3. Two-component-heat-curing type resinous composition consisting of
   (a) a polyisocyanate component comprising at least one bi-to hexa-functional polyisocyanate compound, and
   (b) a polyepoxide component comprising at least one bi-to hexafunctional polyepoxide compound, either component (a) or (b) containing organo antimony halide and the remaining component (b) or (a) containing organo tin halide or zinc halide or mixture of organo tin halide and zinc halide.

4. Heat-resisting molded article obtained by reacting any one of the resinous compositions of claims 1 to 3 in a mold at a temperature between room temperature and 150° C.

* * * * *